US012756903B2

(12) United States Patent
Li et al.

(10) Patent No.: US 12,756,903 B2
(45) Date of Patent: Oct. 6, 2026

(54) METHOD AND APPARATUS FOR GENERATING COMMENT INFORMATION BASED ON LARGE MODEL, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Yi Li, Beijing (CN); Li Ma, Beijing (CN); Lunan Zhao, Beijing (CN); Jie Liu, Beijing (CN); Tianzhong Hu, Beijing (CN); Huilin Li, Beijing (CN); Yu Chen, Beijing (CN); Yongjuan Che, Beijing (CN); Aowei Li, Beijing (CN); Tao Li, Beijing (CN); Hanmeng Liu, Beijing (CN); Shouke Qin, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 34 days.

(21) Appl. No.: 18/988,321

(22) Filed: Dec. 19, 2024

(65) Prior Publication Data

US 2025/0119621 A1 Apr. 10, 2025

(30) Foreign Application Priority Data

Sep. 13, 2024 (CN) ......................... 202411291966.5

(51) Int. Cl.
*H04N 21/4788* (2011.01)
*G11B 27/031* (2006.01)
*H04L 47/125* (2022.01)

(52) U.S. Cl.
CPC ....... *H04N 21/4788* (2013.01); *G11B 27/031* (2013.01); *H04L 47/125* (2013.01)

(58) Field of Classification Search
CPC .............. H04L 47/125; H04N 21/4788; G11B 27/031; G06F 40/166; G06F 16/735; G06F 16/738; G06F 16/7834; G06F 16/7844
See application file for complete search history.

(56) References Cited

U.S. PATENT DOCUMENTS

2013/0282611 A1 10/2013 Avedissian
2014/0289611 A1 9/2014 Norwood et al.
(Continued)

FOREIGN PATENT DOCUMENTS

CN 106027486 A 10/2016
CN 107220387 A 9/2017
(Continued)

OTHER PUBLICATIONS

Jun, Sun et al. "Deep Neural Networks Model of Texts Using Reviews for Recommendation" China Computer & Communication, Jan. 2020 (4 pages).

*Primary Examiner* — Benjamin M Thieu
(74) *Attorney, Agent, or Firm* — Osha Bergman Watanabe & Burton LLP

(57) ABSTRACT

The disclosure provides a method and an apparatus for generating comment information based on a large model, an electronic device and a storage medium, relates to a technical field of artificial intelligence, and in particular to the technical fields of deep learning, large model, and natural language processing, and the like. The specific technical solution includes: obtaining description information of a resource to be commented on by understanding, based on the large model, the resource to be commented on; obtaining, based on the description information, comment information of the resource to be commented on, in which the comment information includes at least a comment video of the resource to be commented on; and displaying the comment video in a comment section.

16 Claims, 5 Drawing Sheets

(56) References Cited

U.S. PATENT DOCUMENTS

| | | | | |
|---|---|---|---|---|
| 2015/0249873 | A1 | 9/2015 | Sprague | |
| 2018/0293088 | A1 | 10/2018 | Chen et al. | |
| 2020/0356782 | A1 * | 11/2020 | Liu | G06V 10/82 |
| 2021/0357653 | A1 | 11/2021 | Feng et al. | |
| 2022/0013025 | A1 * | 1/2022 | Stuckey | G06N 3/091 |
| 2023/0139570 | A1 * | 5/2023 | Sharma | H04L 51/216 709/206 |
| 2023/0283855 | A1 * | 9/2023 | Chen | H04N 21/4788 386/244 |
| 2023/0351523 | A1 * | 11/2023 | Sigal | G06N 3/096 |
| 2025/0088686 | A1 * | 3/2025 | Ary | H04N 21/858 |
| 2025/0240491 | A1 * | 7/2025 | Yin | H04N 21/47217 |
| 2025/0343960 | A1 * | 11/2025 | Paley | H04N 21/2743 |

FOREIGN PATENT DOCUMENTS

| | | | |
|---|---|---|---|
| CN | 109743635 | A | 5/2019 |
| CN | 114938473 | A | 8/2022 |
| CN | 116112621 | A | 5/2023 |
| CN | 116863036 | A | 10/2023 |
| CN | 117454867 | A | 1/2024 |
| CN | 117668297 | A | 3/2024 |
| JP | 2024055796 | A | 4/2024 |

* cited by examiner

METHOD AND APPARATUS FOR GENERATING COMMENT INFORMATION BASED ON LARGE MODEL, ELECTRONIC DEVICE AND STORAGE MEDIUM

CROSS-REFERENCE TO RELATED APPLICATIONS

The present application is based on and claims the priority of Chinese patent application No. 2024112919665 filed on Sep. 13, 2024, the entire contents of which are incorporated herein by reference.

TECHNICAL FIELD

The disclosure relates to a technical field of artificial intelligence, and in particular to technical fields of deep learning, large model, and natural language processing, and the like, and in particular to a method and an apparatus for generating comment information based on a large model, an electronic device and a storage medium.

BACKGROUND

In an information streaming application, user comments are an important part of content consumption. In an existing technology, the user comments are in text form, resulting in a relatively single type of content in a comment section.

SUMMARY

The disclosure provides a method and an apparatus for generating comment information based on a large model, an electronic device and a storage medium.

According to an aspect of the disclosure, a method for generating comment information based on a large model is provided. The method includes:

- obtaining description information of a resource to be commented on by understanding, based on the large model, the resource to be commented on;
- obtaining, based on the description information, comment information of the resource to be commented on, in which the comment information includes at least a comment video of the resource to be commented on; and
- displaying the comment video in a comment section.

According to another aspect of the disclosure, an electronic device is provided. The electronic device includes: at least one processor; and a memory communicatively connected to the at least one processor, in which, the memory stores instructions executable by the at least one processor, when the instructions are executed by the at least one processor, the at least one processor is caused to perform the method according to the aspect described above.

According to another aspect of the disclosure, a non-transitory computer-readable storage medium is provided. The non-transitory computer-readable storage medium stores computer program/instructions, in which the computer instructions are configured to cause a computer to perform the method according to the aspect described above.

According to another aspect of the disclosure, a computer program product is provided. The computer program product includes a computer program/instructions, in which the computer program/instructions, when executed by a processor, implements the method according to the aspect described above.

It should be understood that the description in this section is not intended to identify key or important features of embodiments of the disclosure, nor is it intended to limit the scope of the disclosure. Other features of the disclosure are made easy to understand by the following description.

BRIEF DESCRIPTION OF THE DRAWINGS

The accompanying drawings are used for a better understanding of the disclosure and do not constitute a limitation of the disclosure.

FIG. **2*a*** is a schematic diagram illustrating a displaying of a comment video according to an embodiment of the disclosure.

Figure 3:
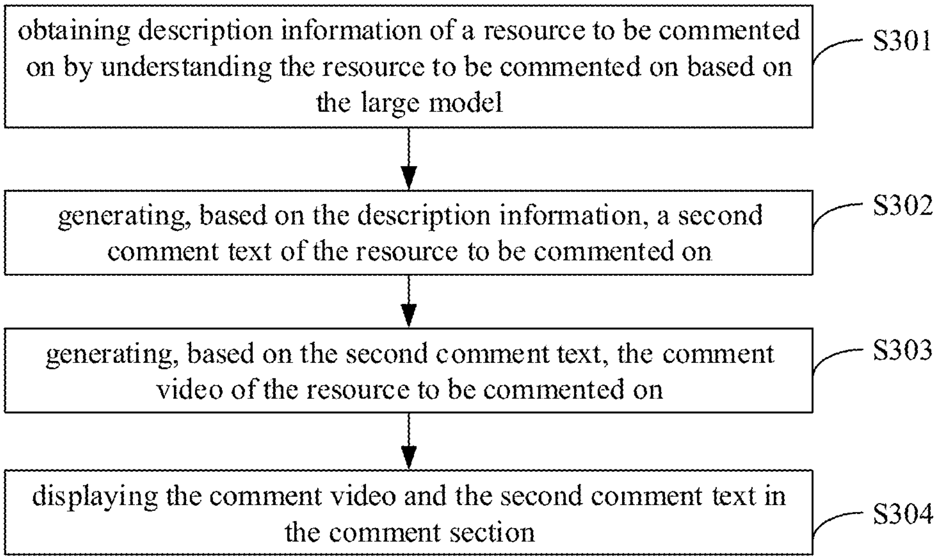

FIG. 3 is a schematic flowchart illustrating another method for generating comment information based on a large model according to an embodiment of the disclosure.

Figure 4:
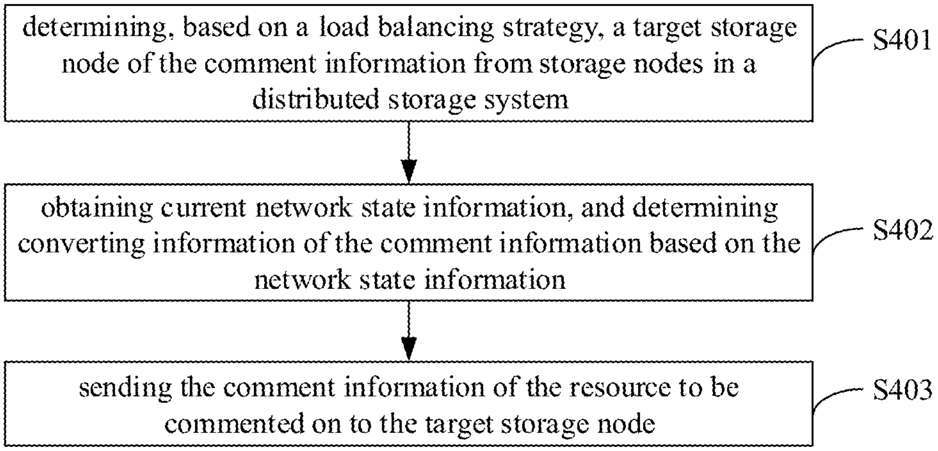

FIG. 4 is a schematic flowchart illustrating another method for generating comment information based on a large model according to an embodiment of the disclosure.

Figure 5:
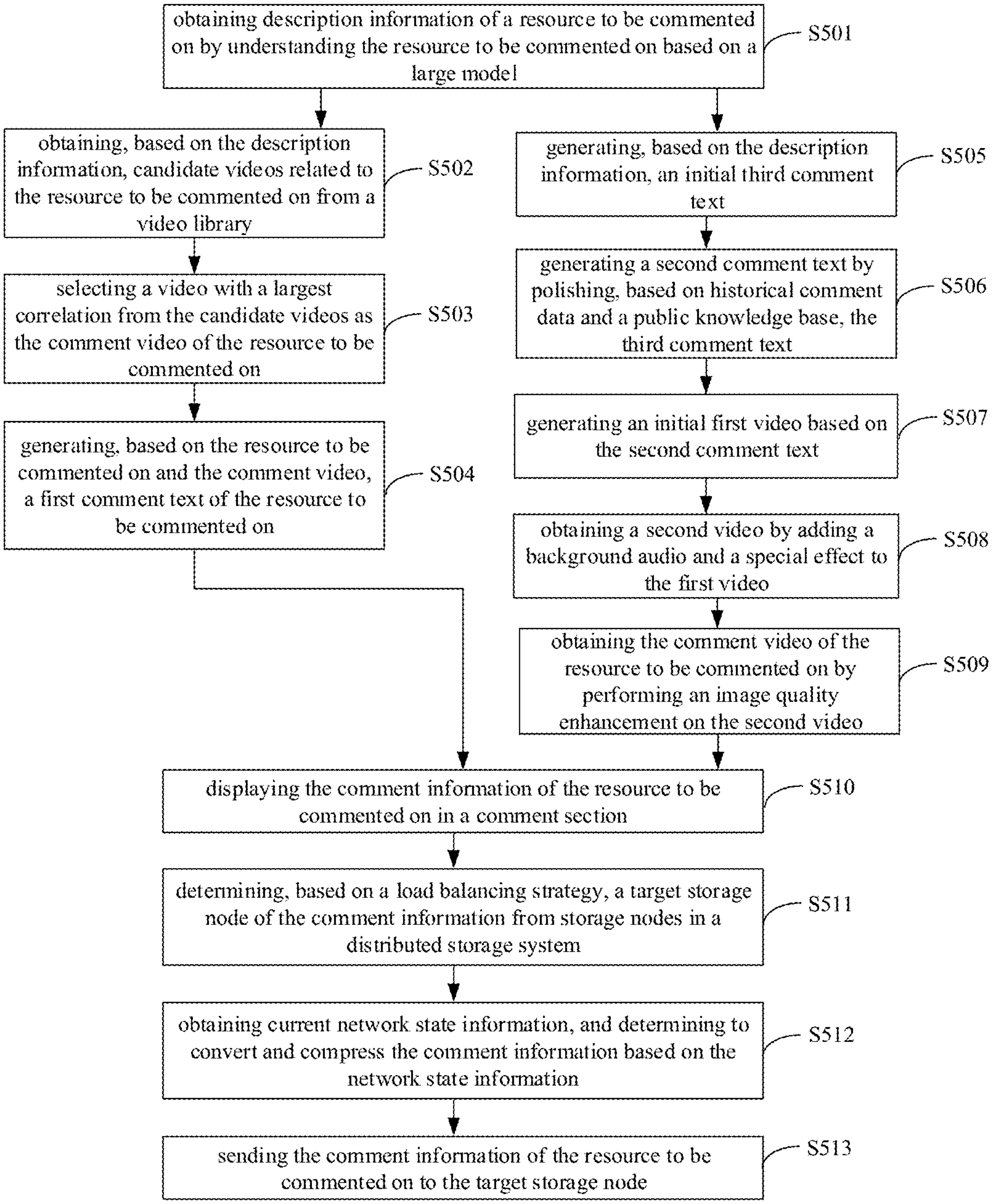

FIG. 5 is a schematic flowchart illustrating another method for generating comment information based on a large model according to an embodiment of the disclosure.

Figure 6:
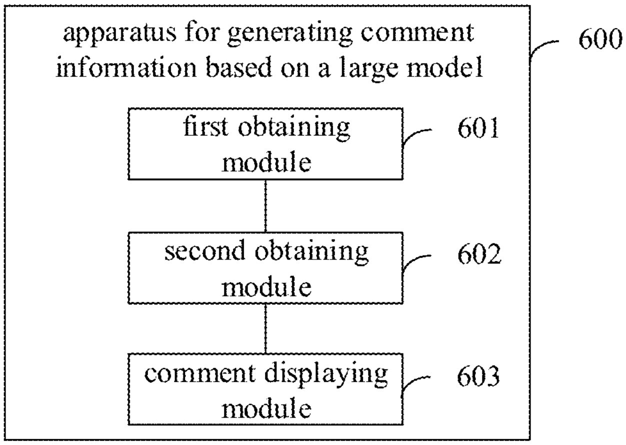

FIG. 6 is a block diagram illustrating an apparatus for generating comment information based on a large model according to an embodiment of the disclosure.

Figure 7:
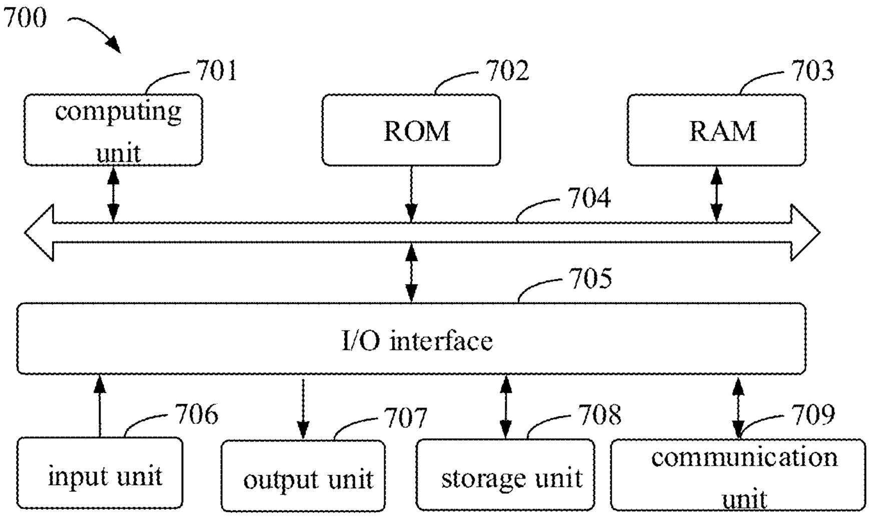

FIG. 7 is a block diagram illustrating an electronic device for generating comment information based on a large model according to an embodiment of the disclosure.

DETAILED DESCRIPTION

Illustrative embodiments of the disclosure are described hereinafter in conjunction with the accompanying drawings, which include various details of the embodiments of the disclosure in order to facilitate understanding, and should be considered exemplary only. Accordingly, those skill in the art should recognize that various changes and modifications may be made to the embodiments described herein without departing from the scope and spirit of the disclosure. Similarly, descriptions of well-known functions and structures are omitted from the following description for the sake of clarity and conciseness.

The method and the apparatus for generating comment information based on a large model, and the electronic device in the embodiments of the disclosure are described below with reference to the accompanying drawings.

Artificial intelligence (AI) is a science of studying enabling computers to simulate certain thought processes and intelligent behaviors (e.g., learning, reasoning, thinking, planning, and the like.) of humans. The AI includes both hardware-level and software-level technologies. The AI hardware technology generally includes aspects such as computer vision technology, speech recognition technology, natural language processing technology, machine learning/deep learning, big data processing technology, and knowledge graph technology.

Natural language processing (NLP) is an important direction in the field of computer science and artificial intelligence, which studies various theories and methods that may realize effective communication between humans and computers in natural language. The NLP is a science that integrates linguistics, computer science, and mathematics. The NLP is mainly applied to aspects such as machine translation, public opinion monitoring, automatic summarization, viewpoint extraction, text categorization, question answering, text semantic comparison, speech recognition, and the like.

The deep learning (DL) is a new research direction in the field of the machine learning (ML). The DL is introduced into ML to bring the ML closer to its original goal—AI. The DL involves learning intrinsic patterns and hierarchical representations of sample data. Information gained during the learning process is highly beneficial for interpreting data such as text, images, and sounds. An ultimate goal of the DL is to enable machines have an analytical learning capability similar to the humans, allowing the machines to recognize data such as text, images, and sounds. The DL is a complex machine learning algorithm that has achieved effects far surpassing previous related technologies, especially in areas like speech and image recognition.

A large model is a machine learning model with large-scale parameters and complex computational structures. The large model is usually built from deep neural networks with billions or even hundreds of billions of parameters. The large model is designed to improve expressive capability and predictive performance of a model, and is capable of handling more complex tasks and data. The large model has a wide range of applications in various fields, including NLP, computer vision, speech recognition, recommender systems, and the like. The large model learns complex patterns and features by training massive amounts of data, and has a stronger generalization ability and makes accurate predictions on unseen data.

Figure 1:
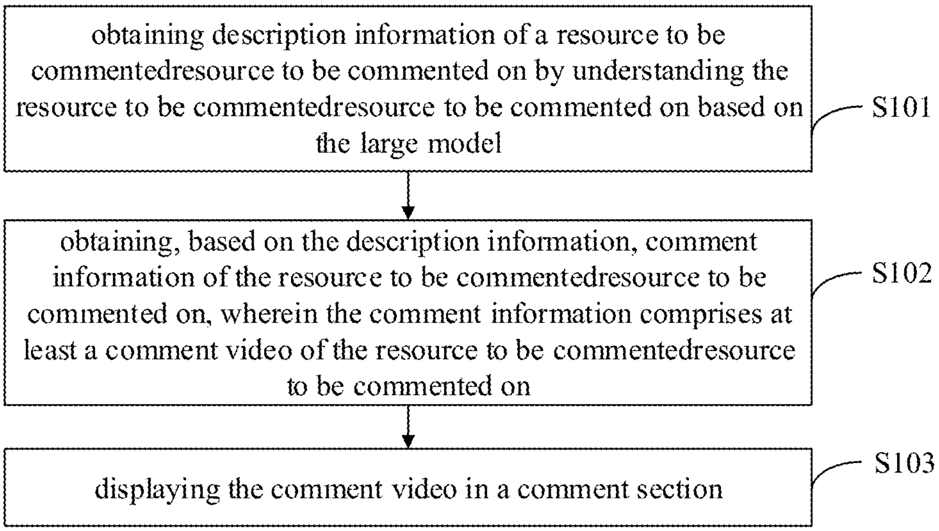
FIG. 1 is a schematic flowchart illustrating a method for generating comment information based on a large model according to an embodiment of the disclosure.

FIG. 1 is a schematic flowchart illustrating a method for generating comment information based on a large model according to an embodiment of the disclosure.

As shown in FIG. 1, the method for generating comment information based on the large model may include, but is not limited to, the following steps S101 to S103.

At S101, description information of a resource to be commented on is obtained by understanding the resource to be commented on based on the large model.

It should be noted that an execution body of the method for generating comment information in the embodiments of the disclosure may be a hardware device having a data information processing capability and/or a necessary software required to drive the hardware device. Optionally, the execution body may include a server, a computer, a user terminal, and other intelligent devices. Optionally, the user terminal includes, but is not limited to, a cell phone, a computer, an intelligent voice interaction device, and the like. Optionally, the server includes, but is not limited to, a network server, an application server, a server of a distributed system, or a server incorporating a blockchain, and the like.

In some embodiments, the resource to be commented on may be one of resources on various types of resource platforms. The resource platforms may include, but are not limited to: news clients, social media platforms, video sharing websites, and the like. The resource to be commented on may include, but is not limited to: an article, an image, an audio, and a video. For example, the article may be a textual material on an academic forum, the image may be an image resource posted on a social media platform, the audio may be a song, a music, a radio drama, and the like, the video may be a short video, or a television (TV) series, a movie, and other resources.

In some embodiments, the resource to be commented on may be understood as a resource viewed by a user on a certain platform. For example, the resource may be a short video currently played on the social platform.

In some embodiments, the description information of the resource to be commented on may include, but is not limited to: key information and topic information of the resource to be commented on. It may be understood that the key information and the topic information of the resource to be commented on may be used as a basis for selecting a subsequent comment video and generating a comment text.

In some embodiments, the key information may include, but is not limited to: a keyword, a title, and a topic of the resource to be commented on.

In some embodiments, semantic analysis and content understanding may be performed on the resource to be commented on using a pre-trained large model to extract the key information and a topic label of the resource to be commented on.

At S102, comment information of the resource to be commented on is obtained based on the description information, in which the comment information includes at least a comment video of the resource to be commented on.

At S103, the comment video is displayed in a comment section.

In some embodiments, the comment information of the resource to be commented on may be output based on the description information and the pre-trained large model. In an embodiment of the disclosure, the comment information includes at least the comment video of the resource to be commented on.

In some embodiments, the comment information of the resource to be commented on may also include a comment text, that is, the comment information of the resource to be commented on may be a combination of the comment video and the comment text.

In some embodiments, the comment video of the resource to be commented on from is obtained from a video library based on the description information. Optionally, if the resource to be commented on is an $i^{th}$ episode of a TV series, the comment video may be an $(i+1)^{th}$ episode of the same TV series, or an $(i-1)^{th}$ episode of the same TV series. Optionally, the comment video may include, but is not limited to, a video offering alternative viewpoints on a same event, a video providing extended background of an event, and the like.

In some embodiments, after obtaining the comment video, a first comment text of the resource to be commented on is generated based on the resource to be commented on and the comment video. It may be understood that the first comment text is a transitional comment text. The first comment text may be configured to guide the user to transition from the resource to be commented on to the comment video, improving the coherence and readability of a comment.

In some embodiments, a second comment text of the resource to be commented on is generated based on the description information. The comment video of the resource to be commented on is generated based on the second comment text.

In some embodiments, the comment section corresponding to the user may include at least two types of comment display areas. For example, the comment display areas may include, but are not limited to, a text display area and a video display area.

In some embodiments, after obtaining the comment information of the resource to be commented on, each type of comment content in the comment information may be filled into a corresponding display area.

According to the method for generating comment information in the embodiments of the disclosure, intelligent generation of the comment video and the comment text is realized, improving the accuracy and intelligence of the comment information. Further, by introducing a video comment format, more diverse comment formats are provided for the user to select from, greatly improving the user experience. In addition, through the intelligent generation of the comment information based on the large model, the comment generation process is simplified and the complexity of the comments is reduced, which increases the speed of generating comments, increases the amount of comments for resources, and makes it easier to push the resource to be commented on.

Figure 2:
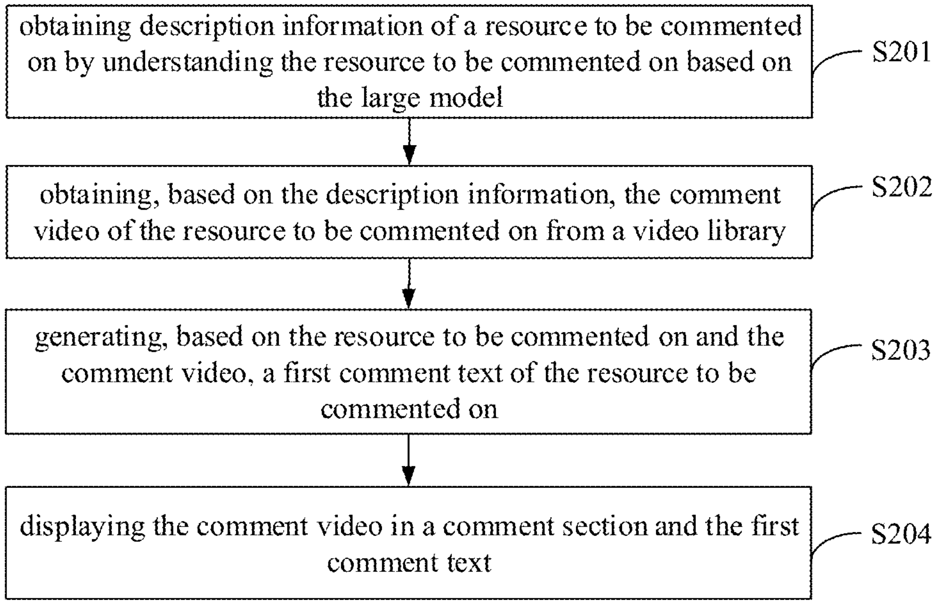
FIG. 2 is a schematic flowchart illustrating another method for generating comment information based on a large model according to an embodiment of the disclosure.

FIG. 2 is a schematic flowchart illustrating a method for generating comment information based on a large model according to an embodiment of the disclosure.

As shown in FIG. 2, the method for generating comment information based on the large model may include, but is not limited to, the following steps S201 to S204.

At S201, description information of a resource to be commented on is obtained.

An optional implementation of step S201 may be found in an optional implementation of step S101 in FIG. 1, and other associated portions of the embodiments involved in FIG. 1, and will not be repeated herein.

At S202, comment information of the resource to be commented on is obtained based on the description information.

In some embodiments, one or more candidate videos related to the resource to be commented on are obtained from a video library based on the description information. Further, a video with a largest correlation is selected from the one or more candidate videos as a comment video of the resource to be commented on.

Optionally, description information of each video in the video library is obtained. A correlation between the resource to be commented on and each video is obtained by performing a correlation calculation based on the description information of the resource to be commented on and the description information of each video. Further, a candidate video related to the resource to be commented on is obtained by filtering videos in a database based on correlations of the videos. Optionally, a video with a correlation greater than or equal to a set value is selected as a candidate video.

Optionally, the candidate videos are sorted by the correlation in descending order, and a candidate video sorted at a head is further selected as a comment video of a video to be commented on, so that the comment video is most matched with the resource to be commented on, which ensures that a comment of the comment video on the resource to be commented on is more accurate and improves the user experience.

In an embodiment of the disclosure, the comment video obtained from the video library may include a next episode of a movie or TV series, a video offering alternative viewpoints on a same event, a video providing extended background of an event, and the like, which not only can improve the interactivity and attractiveness of the comment, but also realize the presentation of multimodal comment. Through the multimodal comment format, multidimensional comments on the resource to be commented on may be realized, making the evaluation of the resource to be commented on more comprehensive and accurate.

At S203, a first comment text of the resource to be commented on is generated based on the resource to be commented on and the comment video.

In some embodiments, after the comment video is obtained, speech analysis and content understanding are performed on the resource to be commented on and the comment video based on the large model, and the first comment text is generated based on the understood content. It may be understood that the first comment text is a transitional comment text. The first comment text may be configured to guide a user to transition from the resource to be commented on to the comment video, improving the coherence and readability of the comment. Optionally, the first comment text may also include a brief evaluation or an expression of a viewpoint about the resource to be commented on and the comment video, so that a further comment on the comment video is realized, which allows the user to better understand content of the resource to be commented on through a comment situation of the comment video.

In some embodiments, historical comment data of the user may be obtained and may include, but is not limited to, historical resources that have been commented on, and corresponding comment content and the like. Further, the generated first comment text is polished based on the historical comment data and a public knowledge base. That is, the first comment text is polished based on information such as the historical comment data of the user and the public knowledge base, so that an expression logic, a statement, a grammar, and the like of the first comment text are not only adapted to an expression mode of human beings, but also can meet a commenting habits of the user, which improves the quality of the comment, and makes the comment more accurate.

In some embodiments, contents such as the expression logic, the statement, the grammar, and the like of the first comment text may first be analyzed based on the public knowledge base. In the case that there is an abnormality in the above aspects of the first comment text, an optimized comment text is obtained by adjusting and optimizing the above aspects, so as to make an expression logic, a statement, a grammar, and the like of the optimized comment text adapt to the expression mode of the human beings. Further, comment preference information of the user may be analyzed based on the historical comment data. For example, the comment preference information may include, but is not limited to, information such as a comment style, a comment length, and the like. A final first comment text is obtained by optimizing a style and length of the optimized comment text based on the comment preference information.

At S204, the comment video and the first comment text are displayed in the comment section.

In some embodiments, the comment section corresponding to the user may include a text display area and a video display area.

In some embodiments, after the comment information of the resource to be commented on is obtained, each type of comment content in the comment information may be filled into a corresponding display area. That is, the comment video is filled into the video display area and the first comment text is filled into the text display area.

In some embodiments, in response to other users swiping to the comment video, the comment video may be played.

Figure 2A:
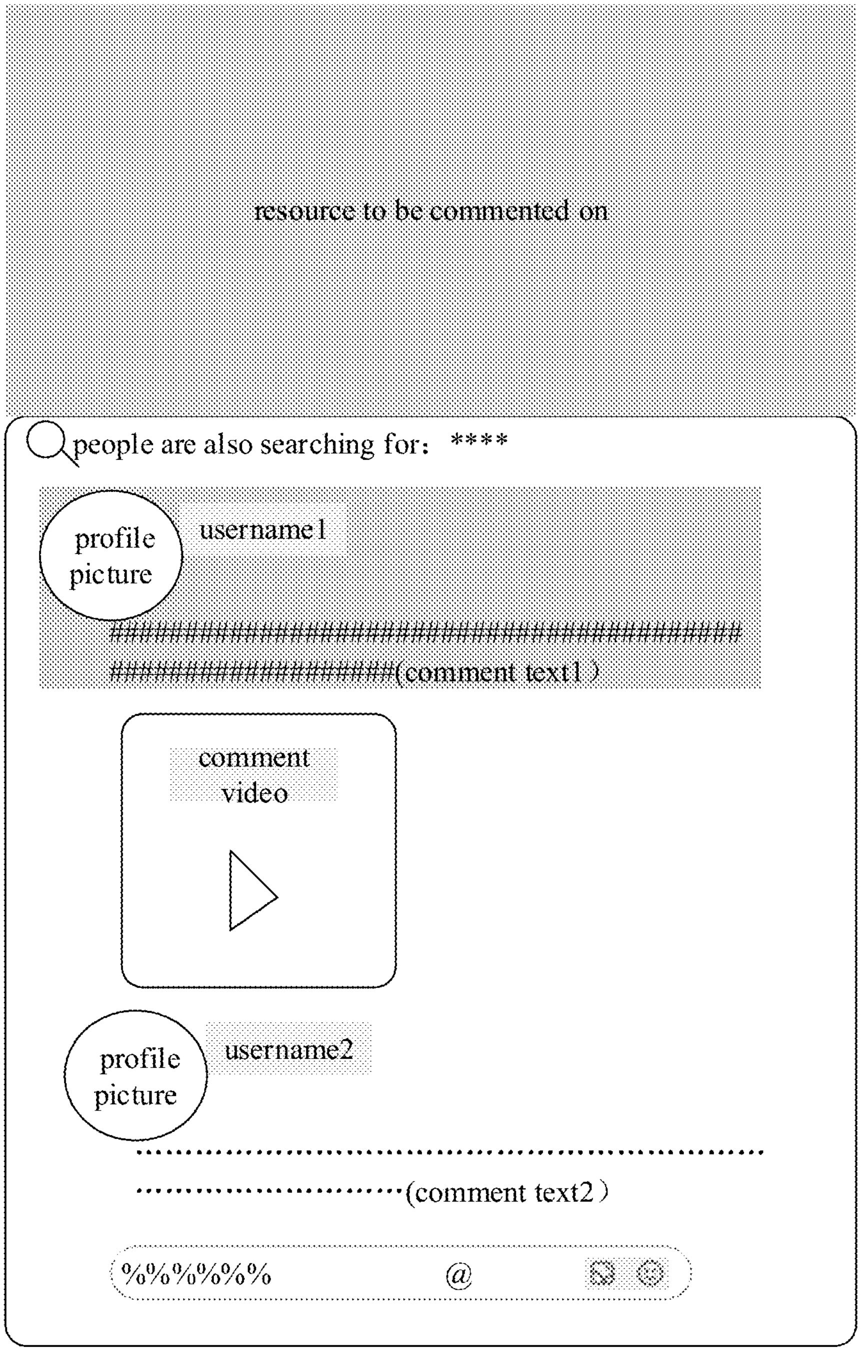

In some embodiments, the other user may click on a play button of the comment video to trigger playback of the comment video, as shown in FIG. 2*a*.

It may be understood that in the embodiments of the disclosure, a comment section in a front-end not only has a text display area, but also increases a video display area, which is able to support a display and playback of the comment video, and ensure that a multimodal video comment is displayed normally to the user.

In embodiments of the disclosure, compared with the user manually searching or inputting comment content, content of the resource to be commented on is deeply understood by using a large model, and a comment video that matches the resource to be commented on is selected from a massive video library. That is, it is able to automatically recommend for the user a comment video that is related to the resource to be commented on. Simultaneously, by combining the resource to be commented on and the comment video, a high-quality transitional comment text is generated to improve the coherence and readability of the comment. In the embodiments, intelligent generation of the comment video and the comment text is realized, improving the accuracy and intelligence level of the comment information. Further, by introducing a video comment format, more diverse comment formats are provided for the user to select from, greatly improving the user experience. In addition, through the intelligent generation of the comment information based on the large model, the comment generation process is simplified and the complexity of the comments is reduced, which increases the speed of generating comments, increases the amount of comments for the resources, and makes it easier to push the resource to be commented on.

FIG. 3 is a schematic flowchart illustrating a method for generating comment information based on a large model according to an embodiment of the disclosure.

As shown in FIG. 3, the method for generating comment information based on the large model may include, but is not limited to, the following steps S301 to S304.

At S301, description information of a resource to be commented on is obtained.

An optional implementation of step S301 may be found in an optional implementation of step S101 in FIG. 1, and other associated portions of the embodiments involved in FIG. 1, and will not be repeated herein.

At S302, a second comment text of the resource to be commented on is generated based on the description information.

In some embodiments, historical comment data of a user is obtained and may include, but is not limited to, historical resources that have been commented on, and corresponding comment contents and the like. Further, the second comment text is generated based on the description information, the historical comment data, and the public knowledge base. That is, the second comment text related to the resource to be commented on is generated by using the large model based on deeply understanding of the resource to be commented on and information such as the historical comment data of the user and the public knowledge base, so that an expression logic, a statement, a grammar, and the like of the second comment text are adapted to an expression mode of human beings, and conform to a commenting habits of the user, which improves the quality of the comment, and makes a comment more accurate.

In some embodiments, an initial third comment text is generated based on the description information. Further, the second comment text is generated by polishing, based on the historical comment data and the public knowledge base, the initial third comment text. Optionally, contents such as an expression logic, a statement, a grammar, and the like of the initial third comment text may first be analyzed based on the public knowledge base. In the case that there is an abnormality in the above aspects of the initial third comment text, an optimized fourth comment text is obtained by adjusting and optimizing the above aspects, so as to make an expression logic, a statement, a grammar, and the like of the optimized fourth comment text adapt to an expression mode of human beings. Further, comment preference information of the user may be analyzed based on the historical comment data. For example, the comment preference information may include, but is not limited to, information such as a comment style, a comment length, and the like. A final second comment text is obtained by optimizing a style and a length of the optimized fourth comment text based on the comment preference information.

Optionally, the second comment text may be an expression of a viewpoint, an expression of an emotion, or an extended discussion, and the like, of the resource to be commented on, which is able to further express the emotion of the user.

At S303, a comment video of the resource to be commented on is generated based on the second comment text.

In some embodiments, the comment video of the resource to be commented on may be obtained by inputting the second comment text into a pre-trained text-to-video generation model. By generating the comment video based on the second comment text, the obtaining of the comment video does not belong to existing video resources, which can enrich content of the comment video, and reduce the repetition probability of the comment video of a same resource to be commented on.

In some embodiments, an initial first video may be obtained by inputting the second comment text into the pre-trained text-to-video generation model. Further, in order to increase the presentation effect and quality of the commented video, a second video may be obtained by adding at least one of a background audio or a special effect to the first video, and the comment video of the resource to be commented on may be obtained by performing an image quality enhancement on the second video. That is, only the background audio may be added to the first video, or only the special effect may be added to the first video, or both the background audio and the special effect may be added to the first video. Optionally, the background audio may be a background music, dubbing voiceover or narration, and the like.

In some embodiments, a target background audio is selected from candidate background audios and/or a target special effect is selected from candidate special effects based on at least one piece of content of the first video and the second comment text, and the second video is obtained by adding the target background audio and/or the target special effect to the first video. That is, the at least one piece of content of the first video and the second comment text is understood based on the large model, and the target background audio is selected from the candidate background audios and/or the target special effect is selected from the candidate special effects based on an understood content.

In some embodiments, a selection operation of the user is received, the target background audio and the target special effect is determined based on the selection operation, and the second video is obtained by adding the target background audio and the target special effect to the first video.

In some embodiments, historical operations or a current operation of the image quality enhancement is obtained. A target image quality parameter corresponding to the first video is determined based on the historical operations or the current operation of the image quality enhancement. Further, the comment video of the resource to be commented on is obtained by performing, based on the target image quality parameter, the image quality enhancement on the second video.

In some embodiments, an image quality preferred by the user may be determined based on the historical operations of the image quality enhancement. An image quality parameter with a largest usage frequency is selected from the historical operations as the target image quality parameter, so that the image quality better conforms to a habits of the user, the quality of the comment video is improved, and the user experience is also improved.

In some embodiments, an initial image quality parameter of the first video is obtained, and in response to the initial image quality parameter not meeting an image quality requirement, the comment video of the resource to be commented on is obtained by performing the image quality enhancement on the second video.

In embodiments of the disclosure, by adding the background audio and the special effect to the comment video, elements of the comment video are more comprehensive, and the image quality may be enhanced, which increases the quality of the comment video, and improves the intelligence level of the comment video.

At S304, the comment video and the second comment text are displayed in the comment section.

An optional implementation of step S304 may be found in an optional implementation of step S204 in FIG. 2, and other associated portions of the embodiments involved in FIG. 1, and will not be repeated herein.

In embodiments of the disclosure, compared with the user manually searching or inputting comment content, content of the resource to be commented on is deeply understood by using a large model to generate a high-quality comment text, and then a comment video matching the resource to be commented on is generated based on the comment text. In the embodiments, a video is generated based on the text, which makes the generation of the comment video more efficient. In particular, on social media platforms, an amount of comments is often related to hotness of a resource. Intelligent comments may simplify a commenting operation, improving the comment speed, and rapidly increase the amount of comments, which makes it easier to push the resource to be commented on. In addition, the comment video may be optimized to further improve the quality of the comment video, which may improve the user satisfaction and experience. Further, by introducing a video comment format, more diverse comment formats are provided for users to select from, greatly improving the user experience of comments.

It should be understood that the above two methods for generating the comment video may be freely selected by the user. A selection operation may be set up in a front-end interface. The user selects a preferred method from the two methods for generating the comment video through the selection operation, which increases the freedom of selection of the user and improves the user experience. Alternatively, when no suitable comment video is selected from the video library, the comment video may be generated based on the second comment text. By generating the comment video based on the text, a high-quality comment video may be generated, and the generation process of the comment video may be more simplified and more efficient, improving the intelligence level of the comment video.

The comment information of the resource to be commented on may be stored based on the above embodiments. As shown in FIG. 4, a process of storing the comment information of the resource to be commented on may include, but is not limited to, the following steps S401 to S403.

At S401, a target storage node of the comment information is determined from storage nodes in a distributed storage system based on a load balancing strategy.

In some embodiments, a back-end server may store the comment video in the distributed storage system. The distributed storage system may include a plurality of storage nodes, and a target storage node that is suitable for storing the comment information of the resource to be commented on may be determined from the plurality of storage nodes based on the load balancing strategy. For example, the target storage node may be obtained by performing load balancing based on remaining storage space of storage nodes. The distributed storage system may improve the security of storing the comment information of the resource to be commented on and avoid loss caused by competition of storage space.

At S402, current network state information is obtained, and converting information of the comment information is determined based on the network state information.

At S403, the comment information of the resource to be commented on is sent to the target storage node.

In some embodiments, the current network state information is obtained, and the converting information of the comment information is determined based on the network state information. Optionally, the network state information may include, but is not limited to, network bandwidth, traffic size, network bandwidth occupancy rate, and the like. Optionally, the converting information of the comment information may include, but is not limited to, format conversion information and a compression type, and the like.

Further, target comment information is obtained by converting and compressing the comment information based on the converting information, and the target comment information is sent to the target storage node.

It may be understood that in subsequent browsing, relevant target comment information may be read from the target storage node and an original comment information of the resource to be commented on may be obtained by performing a restoration on the relevant target comment information.

In embodiments of the disclosure, the security of storing the comment information may be improved through distributed storage. A suitable format may be selected for converting and compressing based on conditions of a network and a device, which saves the resource consumption during uploading, and further ensures the security of the comment information during uploading.

FIG. 5 is a schematic flowchart illustrating a method for generating comment information based on a large model according to an embodiment of the disclosure.

As shown in FIG. 5, the method for generating comment information based on the large model may include, but is not limited to, the following steps S501 to S513.

At S501, description information of a resource to be commented on is obtained.

An optional implementation of step S501 may be found in an optional implementation of step S101 in FIG. 1, and other associated portions of the embodiments involved in FIG. 1, and will not be repeated herein.

After obtaining the description information, the comment information of the resource to be commented on may be determined by performing branch 1 steps S502 to S504, or the comment information of the resource to be commented on may be determined by performing branch 2 steps S505 to S509.

At S502, one or more candidate videos related to the resource to be commented on are obtained from a video library based on the description information.

At S503, a video with a largest correlation is selected from the one or more candidate videos as a comment video of the resource to be commented on.

At S504, a first comment text of the resource to be commented on is generated based on the resource to be commented on and the comment video.

Optional implementations of steps S502 to S504 may be found in optional implementations of steps S202 to S203 in FIG. 2, and other associated portions of the embodiments involved in FIG. 2, and will not be repeated herein.

At S505, an initial third comment text is generated based on the description information.

At S506, a second comment text is generated by polishing, based on historical comment data and a public knowledge base, the third comment text.

At S507, an initial first video is generated based on the second comment text.

At S508, a second video is obtained by adding a background audio and a special effect to the first video.

At S509, a comment video of the resource to be commented on is obtained by performing image quality enhancement on the second video.

Optional implementations of steps S505 to S509 may be found in optional implementations of steps S302 to S303 in FIG. 3, and other associated portions of the embodiments involved in FIG. 3, and will not be repeated herein.

At S510, the comment information of the resource to be commented on is displayed in the comment section.

An optional implementation of step S510 may be found in an optional implementation of step S204 in FIG. 2, and other associated portions of the embodiments involved in FIG. 2, and will not be repeated herein.

At S511, a target storage node of the comment information is determined from storage nodes in a distributed storage system based on a load balancing strategy.

At S512, current network state information is obtained, and it is determined to convert and compress the comment information based on the network state information.

At S513, the comment information of the resource to be commented on is sent to the target storage node.

In embodiments of the disclosure, the intelligent generation of comment videos and comment texts is realized, improving the accuracy and intelligence level of the comment information. Further, by introducing a video comment format, more diverse comment formats are provided for users to select from, greatly improving the user experience. In addition, through the intelligent generation of the comment information based on the large model, the comment generation process is simplified and the complexity of the comments is reduced, which increases the speed of generating comments and increases the amount of comments for the resources, which makes it easier to push the resource to be commented on.

Corresponding to the methods for generating comment information based on a large model provided in the embodiments described above, an embodiment of the disclosure also provides an apparatus for generating comment information based on a large model. Since the apparatus provided in the embodiment of the disclosure corresponds to the methods provided in the embodiments described above, the implementations of the methods described above are also applicable to the apparatus provided in the embodiment of the disclosure, which will not be described in detail in the following embodiments.

FIG. 6 is a block diagram illustrating an apparatus for generating comment information based on a large model according to an embodiment of the disclosure.

As shown in FIG. 6, the apparatus 600 for generating comment information based on the large model provided in an embodiment of the disclosure includes a first obtaining module 601, a second obtaining module 602, and a comment displaying module 603.

The first obtaining module 601 is configured to obtain description information of a resource to be commented on.

The second obtaining module 602 is configured to obtain, based on the description information, comment information of the resource to be commented on, in which the comment information includes at least a comment video of the resource to be commented on.

The comment displaying module 603 is configured to display the comment video in a comment section.

In some embodiments, the second obtaining module 602 is further configured to obtain, based on the description information, the comment video of the resource to be commented on from a video library.

In some embodiments, the second obtaining module 602 is further configured to obtain, based on the description information, candidate videos related to the resource to be commented on from the video library; and select a video with a largest correlation from the candidate videos as the comment video of the resource to be commented on.

In some embodiments, the second obtaining module 602 is further configured to, after obtaining the comment video from the video library based on the description information, generate, based on the resource to be commented on and the comment video, a first comment text of the resource to be commented on.

In some embodiments, the second obtaining module 602 is further configured to generate, based on the description information, a second comment text of the resource to be commented on; and generate, based on the second comment text, the comment video of the resource to be commented on.

In some embodiments, the second obtaining module 602 is further configured to obtain historical comment data of a user and a public knowledge base; and polish, based on the historical comment data and the public knowledge base, the first comment text or the second comment text.

In some embodiments, the second obtaining module 602 is further configured to generate, based on the description information, an initial third comment text; and generate the second comment text by polishing, based on the historical comment data and the public knowledge base, the third comment text.

In some embodiments, the second obtaining module 602 is further configured to obtain an initial first video by inputting the second comment text into a pre-trained text-to-video generation model; obtain a second video by adding at least one of a background audio or a special effect to the first video; and obtain the comment video of the resource to be commented on by performing an image quality enhancement on the second video.

In some embodiments, the second obtaining module 602 is further configured to select, based on at least one piece of content of the first video and the second comment text, a target background audio from candidate background audios, and/or, a target special effect from candidate special effects, and obtain the second video by adding the target background audio and/or the target special effect to the first video.

In some embodiments, the second obtaining module 602 is further configured to receive a selection operation, determining, based on the selection operation, the target background audio and the target special effect, and obtain the second video by adding the target background audio and the target special effect to the first video.

In some embodiments, the second obtaining module 602 is further configured to obtain historical operations or a current operation of the image quality enhancement; determine, based on the historical operations or the current operation of the image quality enhancement, a target image quality parameter corresponding to the first video; and obtain the comment video of the resource to be commented on by performing, based on the target image quality parameter, the image quality enhancement on the second video.

In some embodiments, the second obtaining module 602 is further configured to obtain an initial image quality parameter of the first video, and in response to the initial image quality parameter not meeting an image quality requirement, obtain the comment video of the resource to be commented on by performing the image quality enhancement on the second video.

In some embodiments, the comment displaying module 603 is further configured to fill a video display area of the comment section with the comment video.

In some embodiments, the second obtaining module 602 is further configured to determine, based on a load balancing strategy, a target storage node of the comment information from storage nodes in a distributed storage system, and sending the comment information of the resource to be commented on to the target storage node.

In some embodiments, the second obtaining module 602 is further configured to obtain network state information, and determine, based on the network state information, a target format and compression information of the comment video in the comment information; and obtain target comment information by converting and compressing, based on the target format and the compression information, the comment video and sending the target comment information to the target storage node.

The apparatus for generating comment information according to embodiments of the disclosure realizes the intelligent generation of comment videos and comment texts, improving the accuracy and intelligence level of the comment information. Further, by introducing a video comment format, more diverse comment formats are provided for users to select from, greatly improving the user experience. In addition, through the intelligent generation of the comment information based on the large model, the comment generation process is simplified and the complexity of the comments is reduced, which increases the speed of generating comments and increases the amount of comments for the resources, which makes it easier to push the resource to be commented on.

In the technical solutions of the disclosure, the acquisition, storage and application of the personal information of users are in compliance with relevant laws and regulations, and do not violate public order and morals.

According to embodiments of the disclosure, an electronic device, a readable storage medium, and a computer program product are further provided.

Referring to FIG. 7, it is a block diagram illustrating an electronic device 700 according to an embodiment of the disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital assistants, cellular phones, smart phones, wearable devices, and other similar computing devices. The components shown herein, their connections and relationships, and their functions are merely examples, which are not intended to limit the implementations of the disclosure described and/or required herein.

As shown in FIG. 7, the device 700 includes a computing unit 701, configured to execute various appropriate actions and processes based on a computer program stored in a read-only memory (ROM) 702 or a computer program loaded from a storage unit 708 to a random access memory (RAM) 703. In the RAM 703, various programs and data required for the device 700 may be stored. The computing unit 701, the ROM 702 and the RAM 703 may be connected with each other by a bus 704. An input/output (I/O) interface 705 is also connected to the bus 704.

A plurality of components in the device 700 are connected to the I/O interface 705, which include: an input unit 706 such as a keyboard, a mouse, and the like; an output unit 707 such as various types of displays, speakers, and the like; a storage unit 708 such as a magnetic disk, an optical disk, and the like; and a communication unit 709 such as a network card, a modem, a wireless transceiver, and the like. The communication unit 709 allows the device 700 to exchange information/data through a computer network such as Internet and/or various types of telecommunication networks with other devices.

The computing unit 701 may be various types of general and/or dedicated processing components with various processing and computing abilities. Some examples of a computing unit 701 include, but are not limited to, central processing units (CPUs), graphics processing units (GPUs), various dedicated artificial intelligence (AI) computing chips, various computing units on which a machine learning model algorithm is running, digital signal processors (DSPs), and any appropriate processors, controllers, microcontrollers, and the like. The computing unit 701 executes various methods and processes as described above, for example, a method for generating comment information based on a large model. For example, in some embodiments, the method for generating comment information based on a large model may be further implemented as a computer software program, which is tangibly contained in a machine-readable medium, such as the storage unit 708. In some embodiments, a part or all of the computer program may be loaded and/or installed on the device 700 via the ROM 702 and/or the communication unit 709. When the computer program is loaded into the RAM 703 and executed by the computing unit 701, one or more steps in the method for generating comment information based on the large model may be performed as described above. Optionally, in other embodiments, the computing unit 701 may be configured to perform the method for generating comment information based on the large model in other appropriate ways (for example, by virtue of a firmware).

Various implementations of the systems and techniques described above may be implemented by a digital electronic circuit system, an integrated circuit system, a Field Programmable Gate Array (FPGA), an Application Specific Integrated Circuit (ASIC), an Application Specific Standard Product (ASSP), a System on Chip (SOC), a Complex programmable logic device (CPLD), computer hardware, firmware, software, and/or a combination thereof. These various implementations may be implemented in one or more computer programs/instructions, the one or more computer programs/instructions may be executed and/or interpreted on a programmable system including at least one programmable processor, which may be a dedicated or general programmable processor for receiving data and instructions from a storage system, at least one input device and at least one output device, and transmitting the data and instructions to the storage system, the at least one input device and the at least one output device.

Program codes configured to implement the methods of the disclosure may be written in any combination of one or more programming languages. These program codes may be provided to a processor or a controller of a general-purpose computer, dedicated computer, or other programmable data processing devices, so that the program codes, when executed by the processor or the controller, causes functions/operations specified in the flowchart and/or block diagram to be implemented. The program codes may be executed entirely on a machine, partly executed on the machine, partly executed on the machine and partly executed on a remote machine as an independent software package, or entirely executed on the remote machine or a server.

In the context of the disclosure, the machine-readable medium may be a tangible medium that may contain or store a program for use by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium include electrical connections based on one or more wires, portable computer disks, hard disks, RAMs, ROMs, Electrically Programmable Read-Only-Memory (EPROM), fiber optics, Compact Disc Read-Only Memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor) for displaying information to a user; and a keyboard and pointing device (e.g., a mouse or trackball) using which the user may provide input to the computer. Other kinds of devices may also be used to provide interaction with the user. For example, feedback provided to the user may be any form of sensory feedback (e.g., visual feedback, auditory feedback, or haptic feedback), and the input from the user may be received in any form (including acoustic input, voice input, or haptic input).

The systems and technologies described herein may be implemented in a computing system (e.g., a data server) that includes backend components, or a computing system (e.g., an application server) that includes middleware components, or a computing system (e.g., a user computer with a graphical user interface or a web browser, through which the user may interact with the implementation of the systems and technologies described herein) that includes front-end components, or a computing system that includes any combination of such backend components, middleware components, or front-end components. The components of the system may be interconnected by any form or medium of digital data communication (e.g., a communication network). Examples of the communication network include: a Local Area Network (LAN), a Wide Area Network (WAN), the Internet and a block-chain network.

The computer system may include a client and a server. The client and the server are generally remote from each other and interacting through a communication network. A client-server relationship is generated by computer programs/instructions that run on corresponding computers and have a client-server relationship with each other. The server may be a cloud server, a server of a distributed system, or a server combined with a blockchain.

It should be understood that the steps may be reordered, added, or deleted when various forms of processes shown above are used. For example, the steps described in the disclosure could be performed in parallel, sequentially, or in a different order, as long as the desired result of the technical solution disclosed in the disclosure can be achieved, which is not limited herein.

The above specific embodiments do not constitute a limitation on the protection scope of the disclosure. Those skilled in the art should understand that various modifications, combinations, sub-combinations and substitutions may be made according to design requirements and other factors. Any modification, equivalent replacement and improvement made within the spirit and principle of the disclosure shall be included in the protection scope of the disclosure.

What is claimed is:

1. A method for generating comment information based on a large model, comprising:

obtaining description information of a resource to be commented on by understanding, based on the large model, the resource to be commented on;

obtaining, based on the description information, comment information of the resource to be commented on, wherein the comment information comprises at least a comment video of the resource to be commented on; and displaying the comment video in a comment section;

wherein obtaining, based on the description information, the comment information of the resource to be commented on comprises:

generating, based on the description information, a second comment text of the resource to be commented on; and generating, based on the second comment text, the comment video of the resource to be commented on;

wherein generating, based on the second comment text, the comment video of the resource to be commented on comprises:

obtaining an initial first video by inputting the second comment text into a pre-trained text-to-video generation model;

obtaining a second video by adding at least one of a background audio or a special effect to the first video; and obtaining the comment video of the resource to be commented on by performing an image quality enhancement on the second video.

2. The method according to claim 1, wherein obtaining, based on the description information, the comment information of the resource to be commented on comprises:

obtaining, based on the description information, the comment video of the resource to be commented on from a video library.

3. The method according to claim 2, wherein obtaining, based on the description information, the comment video of the resource to be commented on from the video library comprises:

obtaining, based on the description information, candidate videos related to the resource to be commented on from the video library; and selecting a video with a largest correlation from the candidate videos as the comment video of the resource to be commented on.

4. The method according to claim 2, further comprising:

generating, based on the resource to be commented on and the comment video, a first comment text of the resource to be commented on.

5. The method according to claim 4, further comprising:

obtaining historical comment data of a user and a public knowledge base; and polishing, based on the historical comment data and the public knowledge base, the first comment text or the second comment text.

6. The method according to claim 5, wherein a process of generating the second comment text comprises:

generating, based on the description information, an initial third comment text; and generating the second comment text by polishing, based on the historical comment data and the public knowledge base, the third comment text.

7. The method according to claim 1, wherein obtaining the second video by adding at least one of the background audio or the special effect to the first video comprises at least one of:

selecting, based on at least one piece of content of the first video and the second comment text, a target background audio from candidate background audios, and obtaining the second video by adding the target background audio; or selecting, based on at least one piece of content of the first video and the second comment text, a target special effect from candidate special effects, and obtaining the second video by adding the target special effect to the first video.

8. The method according to claim 1, wherein obtaining the second video by adding at least one of the background audio or the special effect to the first video comprises:

receiving a selection operation, determining, based on the selection operation, at least one of the target background audio or the target special effect, and obtaining the second video by adding at least one of the target background audio or the target special effect to the first video.

9. The method according to claim 1, wherein obtaining the comment video of the resource to be commented on by performing the image quality enhancement on the second video comprises:

obtaining a historical operation or a current operation of the image quality enhancement;

determining, based on the historical operation or the current operation of the image quality enhancement, a target image quality parameter corresponding to the first video; and obtaining the comment video of the resource to be commented on by performing, based on the target image quality parameter, the image quality enhancement on the second video.

10. The method according to claim 1, wherein obtaining the comment video of the resource to be commented on by performing the image quality enhancement on the second video comprises:

obtaining an initial image quality parameter of the first video, and in response to the initial image quality parameter not meeting an image quality requirement, obtaining the comment video of the resource to be commented on by performing the image quality enhancement on the second video.

11. The method according to claim 1, wherein displaying the comment video in the comment section comprises:

filling a video display area of the comment section with the comment video.

12. The method according to claim 1, further comprising:

determining, based on a load balancing strategy, a target storage node of the comment information from storage nodes in a distributed storage system, and sending the comment information of the resource to be commented on to the target storage node.

13. The method according to claim 12, wherein sending the comment information of the resource to be commented on to the target storage node comprises:

obtaining network state information, and determining, based on the network state information, a target format and compression information of the comment video in the comment information; and obtaining target comment information by converting and compressing, based on the target format and the compression information, the comment video and sending the target comment information to the target storage node.

14. An electronic device, comprising:

at least one processor; and a memory communicatively connected to the at least one processor, wherein, the memory stores instructions executable by the at least one processor, when the instructions are executed by the at least one processor, the at least one processor is configured to:

obtain description information of a resource to be commented on by understanding, based on the large model, the resource to be commented on;

obtain, based on the description information, comment information of the resource to be commented on, wherein the comment information comprises at least a comment video of the resource to be commented on; and display the comment video in a comment section;

wherein obtaining, based on the description information, the comment information of the resource to be commented on comprises:

generating, based on the description information, a second comment text of the resource to be commented on; and generating, based on the second comment text, the comment video of the resource to be commented on;

wherein generating, based on the second comment text, the comment video of the resource to be commented on comprises:

obtaining an initial first video by inputting the second comment text into a pre-trained text-to-video generation model;

obtaining a second video by adding at least one of a background audio or a special effect to the first video; and obtaining the comment video of the resource to be commented on by performing an image quality enhancement on the second video.

15. A non-transitory computer readable storage medium, storing computer instructions, wherein the computer instructions are configured to cause a computer to perform:

obtaining description information of a resource to be commented on by understanding, based on the large model, the resource to be commented on;

obtaining, based on the description information, comment information of the resource to be commented on, wherein the comment information comprises at least a comment video of the resource to be commented on; and displaying the comment video in a comment section;

wherein obtaining, based on the description information, the comment information of the resource to be commented on comprises:

generating, based on the description information, a second comment text of the resource to be commented on; and generating, based on the second comment text, the comment video of the resource to be commented on;

wherein generating, based on the second comment text, the comment video of the resource to be commented on comprises:

obtaining an initial first video by inputting the second comment text into a pre-trained text-to-video generation model;

obtaining a second video by adding at least one of a background audio or a special effect to the first video; and obtaining the comment video of the resource to be commented on by performing an image quality enhancement on the second video.

16. A computer program product, comprising a computer program/instructions wherein computer program/instructions, when executed by a processor, implements the method according to claim 1.

* * * * *